United States Patent
Søyland et al.

(10) Patent No.: US 10,370,913 B2
(45) Date of Patent: Aug. 6, 2019

(54) GRIPPER WITH SPINNING MEANS

(71) Applicant: Nabors Lux 2 SARL, Luxembourg (LU)

(72) Inventors: Svein Søyland, Kvernaland (NO);
Kjetil Næsgaar, Røyneberg (NO)

(73) Assignee: NABORS LUX 2 SARL, Luxembourg (LU)

( * ) Notice: Subject to any disclaimer, the term of this patent is extended or adjusted under 35 U.S.C. 154(b) by 62 days.

(21) Appl. No.: 15/531,644

(22) PCT Filed: Dec. 1, 2015

(86) PCT No.: PCT/NO2015/050232
§ 371 (c)(1),
(2) Date: May 30, 2017

(87) PCT Pub. No.: WO2016/089216
PCT Pub. Date: Jun. 9, 2016

(65) Prior Publication Data
US 2017/0328149 A1 Nov. 16, 2017

(30) Foreign Application Priority Data
Dec. 2, 2014 (NO) .................................. 20141449

(51) Int. Cl.
*E21B 19/16* (2006.01)
*B25J 19/00* (2006.01)
*E21B 19/14* (2006.01)

(52) U.S. Cl.
CPC ......... *E21B 19/161* (2013.01); *B25J 19/0045* (2013.01); *E21B 19/14* (2013.01); *E21B 19/168* (2013.01)

(58) Field of Classification Search
CPC ...... E21B 19/261; E21B 19/14; E21B 19/168; B25J 19/0045
See application file for complete search history.

(56) References Cited

U.S. PATENT DOCUMENTS 3,061,011 A * 10/1962 Paget ..................... E21B 19/14
166/77.53
3,518,903 A 7/1970 Ham
(Continued)

FOREIGN PATENT DOCUMENTS

| EP | 1741113 | 1/2007 |
|----|---------|--------|
| GB | 638635 | 6/1950 |

OTHER PUBLICATIONS

Publication of PCT/NO2015/050232 dated Jun. 6, 2016 (31 pages).
(Continued)

*Primary Examiner* — Yong-Suk Ro
(74) *Attorney, Agent, or Firm* — Enrique Abarca; Abel Schillinger, LLP

(57) ABSTRACT

A gripping device for gripping and spinning a pipe body of various diameters includes a gripping assembly having a pair of gripping arms for gripping the outer surface of the pipe body, and a spinning device having a pair of rollers for spinning the pipe body as it is engaged by gripping arms. The gripping device also includes a rotatable input shaft and a coupler. The coupler connects the rotatable input shaft to the gripping assembly and to the spinning device and is employed to selectively engage the gripping arms and the spinning device. A brake is provided so as to selectively prevent at least one of the gripping assembly and the spinning device from being operated upon rotating the rotatable input shaft.

19 Claims, 13 Drawing Sheets

(56) References Cited

U.S. PATENT DOCUMENTS

| | | | |
|---|---|---|---|
| 3,518,908 A | | 7/1970 | Ham |
| 3,892,148 A | | 7/1975 | Wiley |
| 4,709,766 A | * | 12/1987 | Boyadjieff .............. E21B 19/14 |
| | | | 175/52 |
| 4,715,253 A | * | 12/1987 | Falgout, Sr. .......... E21B 19/168 |
| | | | 81/57.14 |
| 4,774,861 A | | 10/1988 | Hamilton |
| 7,000,502 B2 | * | 2/2006 | Belik .................... E21B 19/161 |
| | | | 81/57.2 |
| 2009/0277308 A1 | | 11/2009 | Light |
| 2013/0283589 A1 | | 10/2013 | Jason |

OTHER PUBLICATIONS

Search report for Norwegian Application No. 20141449 dated Jun. 16, 2015 (2 pages).

International Search Report for PCT/NO2015/050232 dated Feb. 21, 2017 (27 pages).

First Written Opinion for PCT/NO2015/050232 dated May 3, 2016 (5 pages).

Second Written Opinion for PCT/NO2015/050232 dated Oct. 27, 2016 (6 pages).

Response to Second Written Opinion for PCT/NO2015/050232 dated Dec. 19, 2016 (2 pages0.

* cited by examiner

GRIPPER WITH SPINNING MEANS

CROSS REFERENCE TO RELATED APPLICATIONS

This application is the U.S. National Stage entry under 35 U.S.C. § 371 of International Patent Application No. PCT/NO2015/050232, filed Dec. 1, 2015, and entitled "Gripper with spinning means," which claims priority to Application No. NO20141449, filed Dec. 2, 2014, all of which are hereby incorporated herein by reference in their entireties for all purposes.

BACKGROUND

Handling of pipe bodies, such as pipes and so-called subs, crossovers, kelly cocks, bottom hole assemblies, etc., may be a challenge on a rig floor. To connect or disconnect such pipe bodies from a pipe string it is today common to use a combination of manual work and machinery. One machine is typically used for lifting the pipe body while another machine is used to spin the pipe body so as to connect it to the drill string. The involvement of two different machines makes the work time consuming and the involvement of manual work together with heavy machinery is a potential safety risk.

Grippers are known that combine gripping functionality with spinning functionality.

Some grippers from the prior art are disclosed in the following patents and patent applications:

WO 2004/079147 A2;
US 2009/053014 A1;
US 2013/283589 A1; and
U.S. Pat. No. 3,892,148.

Grippers with spinning means according to the prior art typically take up a lot of space and have a limited possibility of rotational and translational movement. The gripping means and the spinning means are often driven via separate input shafts that take up space and limit the potential freedom of movement of the gripper. Grippers according to the prior art are also typically provided with a plurality of cables, wires etc. to provide sufficient power and control of the gripper, such cables and wires are also limiting the freedom of movement and constituting a potential security risk in explosion-exposed areas, such as on a drilling rig.

In US 2009/0277308 A, an open-faced rod-spinning device configured for making and/or breaking joints between threaded drill rods is disclosed. The rod-spinning device includes a drive gear with an open face, the drive gear being coupled to a plurality of drive pins. The rod-spinning device further includes a carriage assembly including an open lace for receiving and rotating about a drill rod. The carriage assembly including a plurality of gripping lobes adapted to be engaged and rotated by the drive pins about pivot pins. The drive gear is adapted to rotate relative to the carriage assembly in order to engage and rotate the gripping lobes.

GB 638,635 A discloses the use of a differential coupling means for connecting one input shaft to two different means of pipe handling equipment.

BRIEF SUMMARY OF THE DISCLOSURE

In a first aspect, the present disclosure relates to a gripper for gripping and spinning a pipe body, the gripper comprising:

a rotatable input shaft;
gripping means for gripping said pipe body; and
spinning means for spinning said pipe body while it is being gripped by said gripping means, wherein the gripper further comprises a coupling means for connecting said rotatable input shaft to said gripping means and to said spinning means and for selectively engaging either one of said gripping means and said spinning means while disengaging the other one of said gripping means and said spinning means.

In one exemplary embodiment, said coupling means may comprise a differential coupling means. A differential coupling means in the form of a differential gear may allow one rotatable input shaft to be used to operate both the gripping means and the spinning means. The power from the rotatable input shaft may thus be distributed in what may be regarded as two branches, wherein one branch provides power to the gripping means, whereas the other branch provides power to the spinning means. The gripper may be adapted to operate one of the branches at a time, for instance by selectively locking one of the branches of the differential coupling as will be described more in detail below, and in the figures.

In another embodiment, the coupling means may comprise a clutching means for selectively engaging and disengaging said gripping means and said spinning means. The selective engagement of said gripping means and said spinning means may, for instance, be realized by means of two interacting clutches.

In certain embodiments described herein, one and the same tool, the gripper, may be used both to grip and spin pipe bodies. At the same time, the one rotatable input shaft ensures that the gripper may be connected to a conveying means, such as a robot, while still allowing for full rotational and translational freedom for the gripper. The gripper of this embodiment is, at the same time, very compact and easily handled.

In one disclosed embodiment, the gripper may further comprise braking means for engaging said differential coupling means so as to selectively prevent said gripping means and said spinning means from being operated upon rotating said rotatable input shaft. This may be advantageous so as to disable one of the two functionalities, i.e. gripping or spinning, while enabling the other functionality. In some embodiments, the braking means may engage one of the two branches of the differential coupling means at time, and the braking means may comprise one brake or it may comprise several independently operatable brakes. The brakes may be of an electromechanical type. In some embodiments, where the coupling means comprises clutching means, one clutch may replace the differential gear itself, while one clutch may replace a brake connected to one of the branches.

In one exemplary embodiment, the gripper may comprise inductive coupling means for receiving wireless power and/or communication from an external source. This means that power and communication may be transferred wirelessly from an external source, such that the gripper may be connected to and operated from an external component, a conveying means, without the need for wired and cabled connections. This may also make possible the use of a gripper of an exemplary embodiment in explosion-exposed areas, i.e. to EX certify the gripper. It may thus be advantageous if electronic components in the gripper are provided in an encapsulated chamber of the gripper, such as in an oil-filled chamber. The communication from the source to the gripper may be bi-directional, also enabling feedback from the gripper.

In an exemplary embodiment, said inductive coupling means may be connected to said differential coupling means for selectively engaging said gripping means and said spinning means. The power and communication transferred to the gripper may for instance be utilized to engage or disengage the above-mentioned braking means so as to choose which function, gripping or spinning, to use. The data communication may be bi-directional. In one disclosed embodiment, the inductive coupling means may be such as developed and offered by the Norwegian company Wireless Power and Communication (WPC). Reference is made to WPC's European patent no. 1741113 for an in-depth description of wireless power and data communication transfer.

The spinning means may be one or more active rollers, though the present disclosure is not to be construed as limited to rollers as many alternative spinning means, such as various circulating endless belts and chains, may also be used.

In an exemplary embodiment, gearing means, connecting said active rollers to said differential coupling means, may be provided inside said one or more active rollers. This may be advantageous for providing sufficient gearing for the rollers while at the same time saving significant space in the gripper, implying that the gripper may be made even more compact and thus becomes even more easily handled.

In an embodiment, the gripping means may be provided with one or more passive rollers. This may be advantageous for ensuring smooth, substantially friction-less spinning of a pipe body while it is being held by the gripper.

In an embodiment, the gripping means may be adapted to securely hold pipes of different diameters. This may be realized by providing the gripper with gripping means as disclosed in U.S. Pat. No. 8,419,097 assigned to the present applicant and incorporated herein by this reference. Alternatively, the possibility of securely gripping pipes of different diameters may also be realized by supporting gripping arms of the gripping means in eccentric bearings as disclosed in WO 2013/036134 A2 which is also incorporated herein by the reference.

In an embodiment, the gripper may further comprise connecting means for selectively connecting said gripper to a gripper conveying means. The connection means may connect the gripper input shaft to an output shaft on the conveying means, as well as provide an interface between the gripper and the gripper conveying means. The connection means may comprise a connection flange.

In an embodiment, the gripper may be provided with biasing means for biasing the gripping means towards a pipe body or for biasing the pipe body towards the gripping means also when the gripping functionality is disabled, for instance when the pipe body is being held and moved including when the spinning functionality is enabled. This will ensure a good grip around the pipe body also when the gripping functionality is disabled, such as when a braking means locks the gripping function. In at least one embodiment, the biasing means may be a torsion spring or the like directly or indirectly connected to the gripping means. The torsion spring may be included in a gearing stage connecting the rotatable input shaft to the gripping means. Alternatively, the biasing means may be connected to the spinning means, such as the active rollers, so as to bias the spinning means towards the pipe body.

In a second aspect, the present disclosure relates to a system for gripping, moving and spinning a pipe body, the system comprising:

a gripper according to the first aspect of the present disclosure; and a gripper conveying means provided with a rotatable output shaft connectable to said rotatable input shaft of the gripper.

The conveying means may thus be used to move the gripper on an operation site, such as on a rig floor. It may be used to move the gripper between a storage location for pipe bodies and a well centre. In particular, the one rotatable input shaft, which is connectable to a rotatable output shaft on the gripper conveying means may allow for a full translational and rotational freedom for the gripper on the gripper conveying means. The gripper conveying means may thus be a robot, including one with a plurality of joints and rotation axes and with translational freedom. The system may be provided with a control unit for operating the gripper and the gripper conveying means automatically or semi-automatically. The control unit may be provided internally or externally from the gripper conveying means.

In an exemplary embodiment of the system, the gripper conveying means may be provided with inductive coupling means for transferring power and/or communication to said gripper. The communication may be bi-directional. Typically, inductive coupling means on the gripper may be brought into proximity with the inductive coupling means on the gripper conveying means upon connecting the rotatable input shaft on the gripper to the rotatable output shaft of the gripper conveying means so as to allow for wireless transfer of power and/or communication between the gripper and the gripper conveying means. The connection between the gripper and the gripper conveying means may thus include a rotatable shaft but without the need for any wires, cables, etc., which may be beneficial for ensuring freedom of rotation and translation as well as for making the system explosion (EX) proof, for instance allowing use of the system in areas where there is a danger of gas ignition. Electronic components of the gripper may be provided in an encapsulated chamber as discussed above. The interface between the gripper and the gripper conveying means may thus be provided as a sealed flange covering the shaft connection and the inductive coupling means.

There is also described a drilling rig provided with a system according to the second aspect of the present disclosure.

In a third aspect, the present disclosure relates to a method for gripping, moving and spinning a pipe body by means of a system according to the second aspect of the present disclosure, the method comprising the steps of:

connecting said rotatable output shaft of the gripper conveying means to said rotatable input shaft on said gripper;

selectively engaging said gripping means so as to grip a pipe body; and selectively engaging said spinning means so as to spin said pipe body.

The method may further comprise the step of moving said pipe body from a storage location to an operation location by means of said gripper conveying means.

The operation location may be over a well centre.

The method may further comprise the step of spinning the pipe body so as to connect or disconnect said pipe body to or from a pipe string. After the pipe body has been connected to a pipe string, the method may also comprise the steps of:

selectively engaging said gripping means so as to release said pipe body from the gripper; and disconnecting said rotatable output shaft of the gripper conveying means from said rotatable input shaft of the gripper.

Thus, the gripper conveying means may selectively disconnect from the gripper. The gripper conveying means may, for instance, place the gripper in a tool magazine. From the tool magazine, the gripper conveying means may connect to another gripper or it may even connect to a completely different tool adapted to perform a different operation. The connection means, i.e. the connection interface between the gripper conveying means and the gripper may be standardized so that a plurality of different tools may be connectable to the gripper conveying means.

BRIEF DESCRIPTION OF THE DRAWINGS

Exemplary embodiments are illustrated in the accompanying drawings, wherein.

DETAILED DESCRIPTION OF THE DISCLOSED EXEMPLARY EMBODIMENTS

Figure 1:
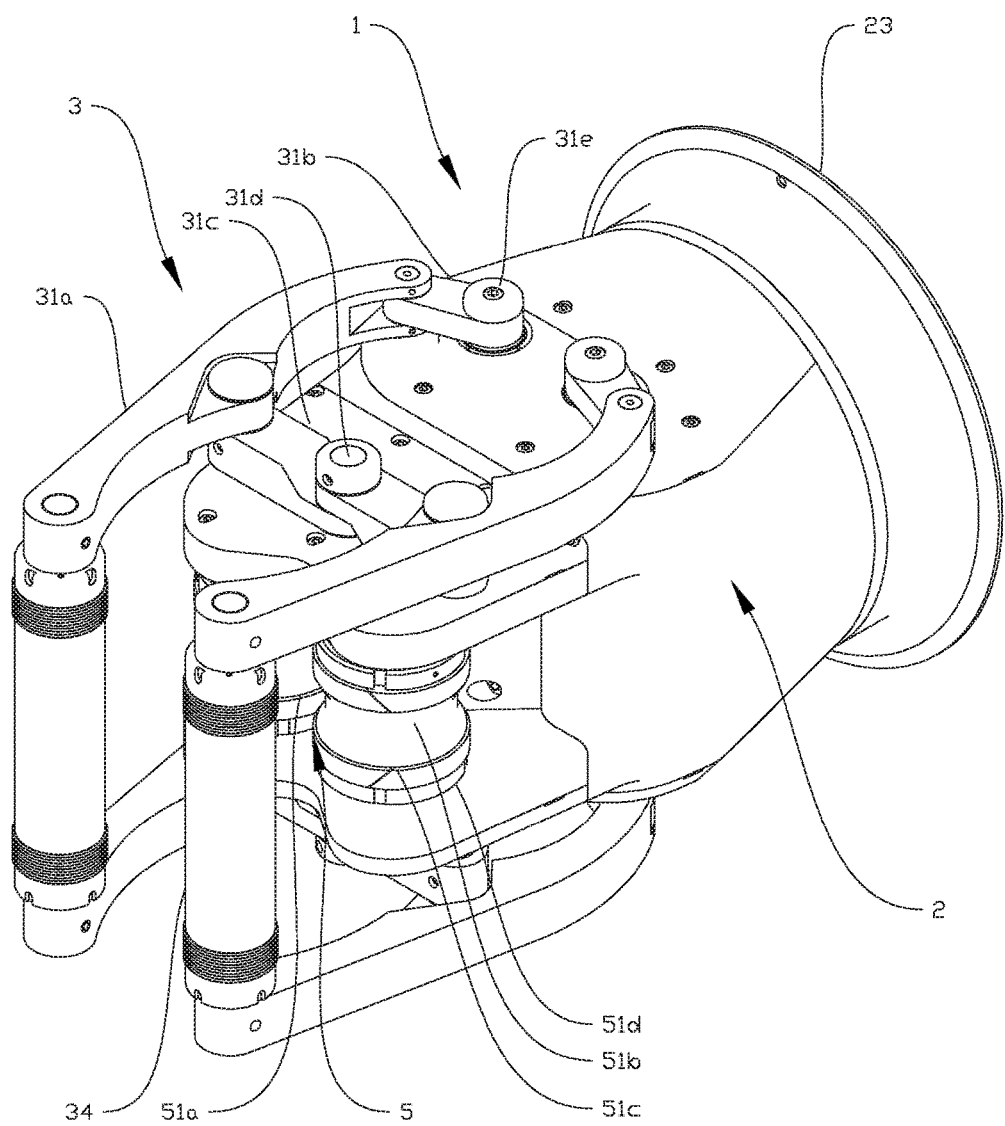
FIG. 1 shows, in a perspective view, a gripper according to the present disclosure.

In the following description, identical reference numerals refer to similar or identical features. The figures may be shown slightly simplified and schematic and the different features on the figures are not necessarily drawn to scale.

Figure 2:
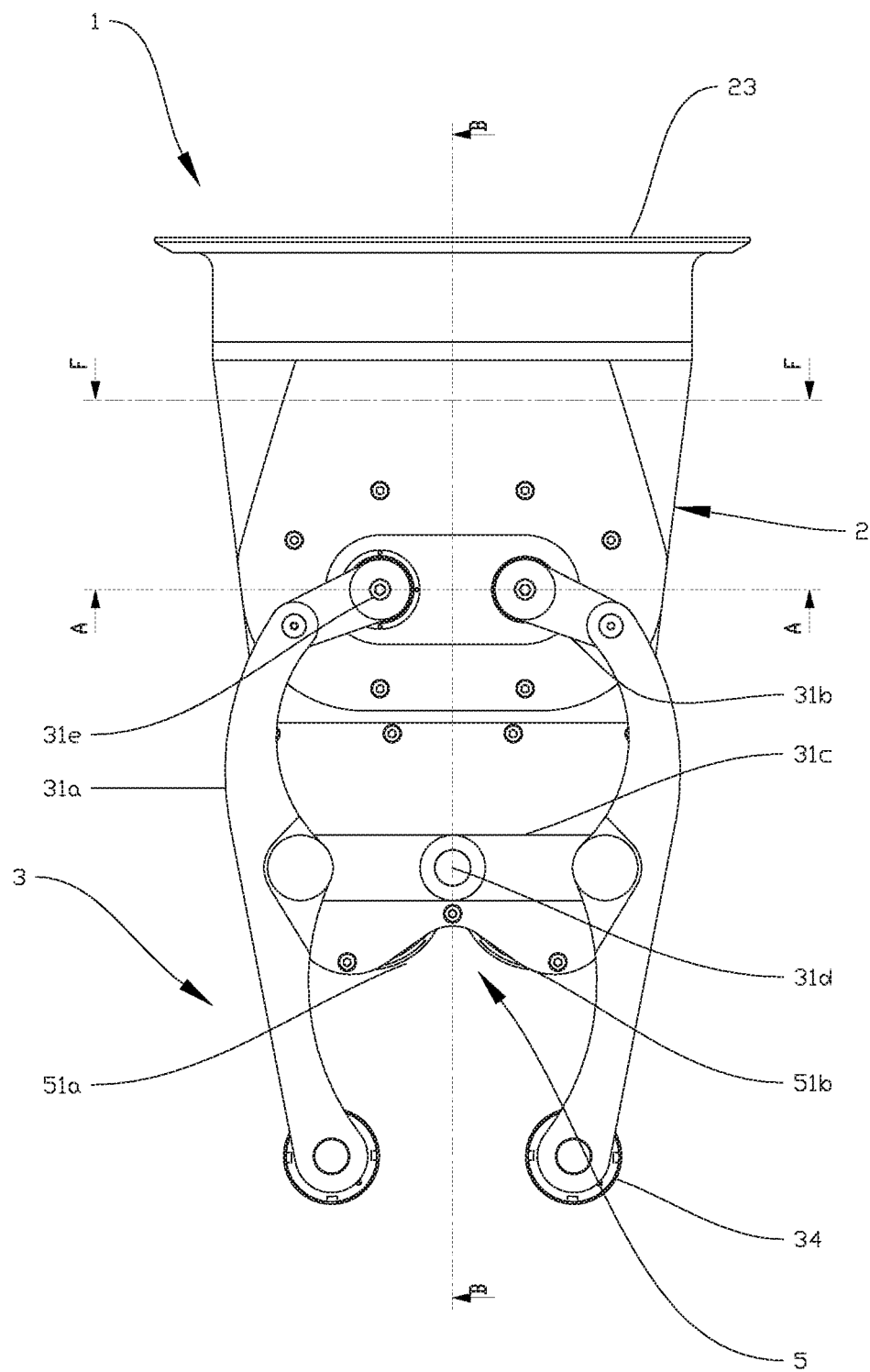
FIG. 2 shows, in a top view, the gripper from FIG. 1.
Figure 3:
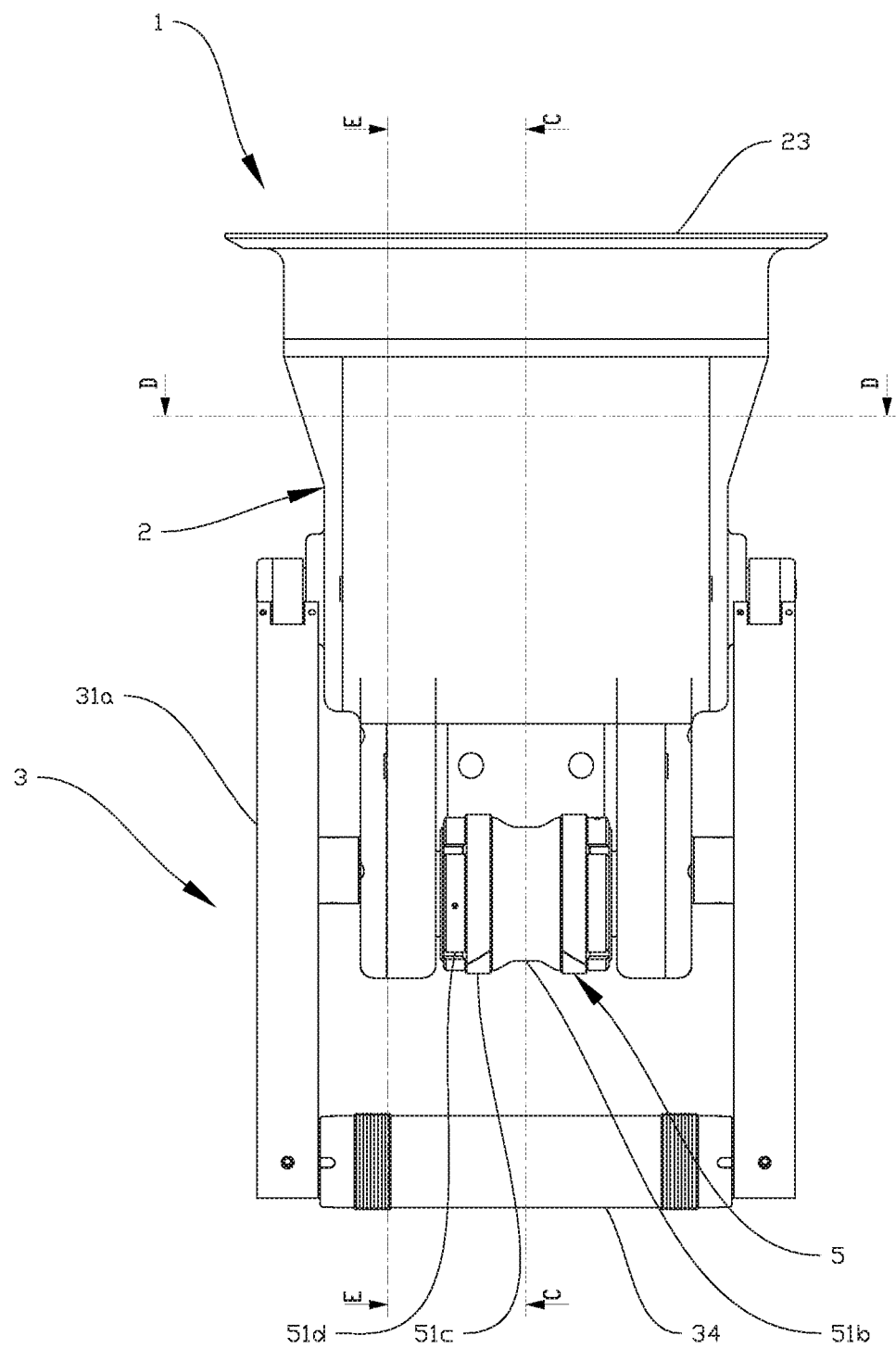
FIG. 3 shows, in a side view, the gripper from FIG. 1.
Figure 4:
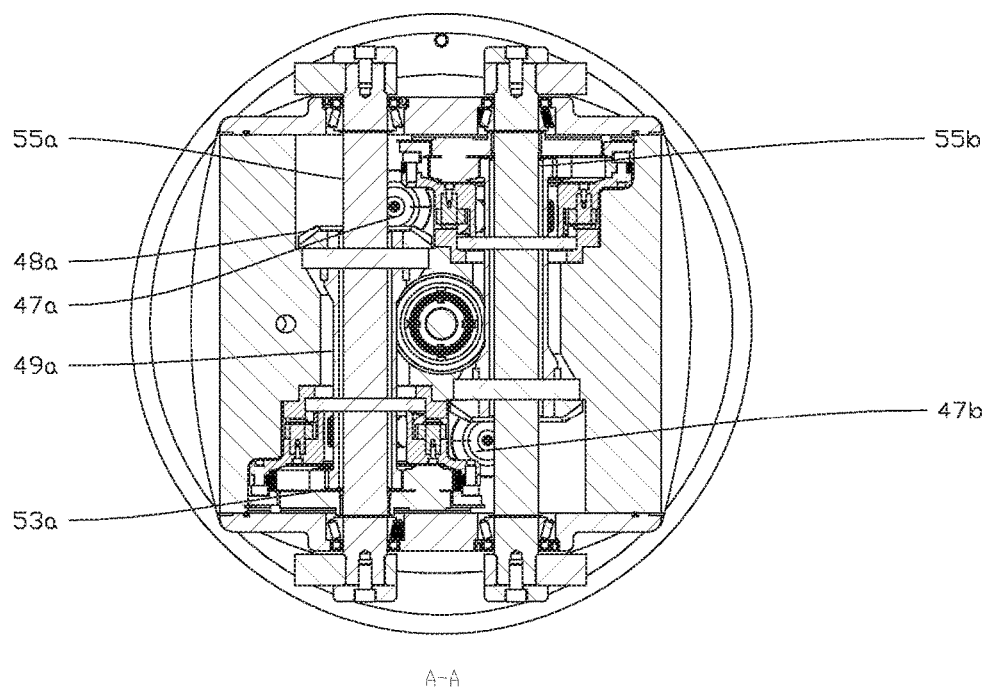
FIG. 4 shows, in a cross-sectional view, the gripper as seen through the line A-A from FIG. 2.

FIGS. 1-3 show a gripper 1 according to the present disclosure. The gripper 1 is provided with a housing 2, to which both gripping means 3 and spinning means 5 are connected. In a normal position of use, the housing 2 covers most of the parts constituting the gripper 1. These parts will be visible with reference to the following cross-sectional drawings. The gripping means 3 is provided in the form of two sets of gripping arms 31a. The gripping arms 31a are driven by drive arms 31b, rotatable around rotation axes 31e, and connected by link arms 31c, the link arms being connected to the gripper housing 2 at a rotation axis 31d. The functionality of the gripping means 3, which allows gripping of pipes and other objects of various diameters, was disclosed in the applicant's own patent U.S. Pat. No. 8,419,097 to which reference is made for an in-depth description of the gripping means 3. The spinning means 5 comprises active rollers 51a, 51b. When holding a pipe body 11, see FIGS. 10 and 11, in the gripping arms 31a, track rings 51c on the active rollers 51a, 51b will engage the pipe body 11 so that the pipe body 11 is spun with the active rollers 51a, 51b. The gripping arms 31a are further provided with passive rollers 34 in order to ease the rotation of a pipe body 11 held in the gripper arms 31a. The gripper 1 is provided with a flanged interface 23 forming a connecting means for a conveying means 14, see FIGS. 12 and 13, as will be described more in detail below with reference to the following figures. FIGS. 2 and 3 show the gripper 1 in a top view and in a side view, respectively.

Figure 5:
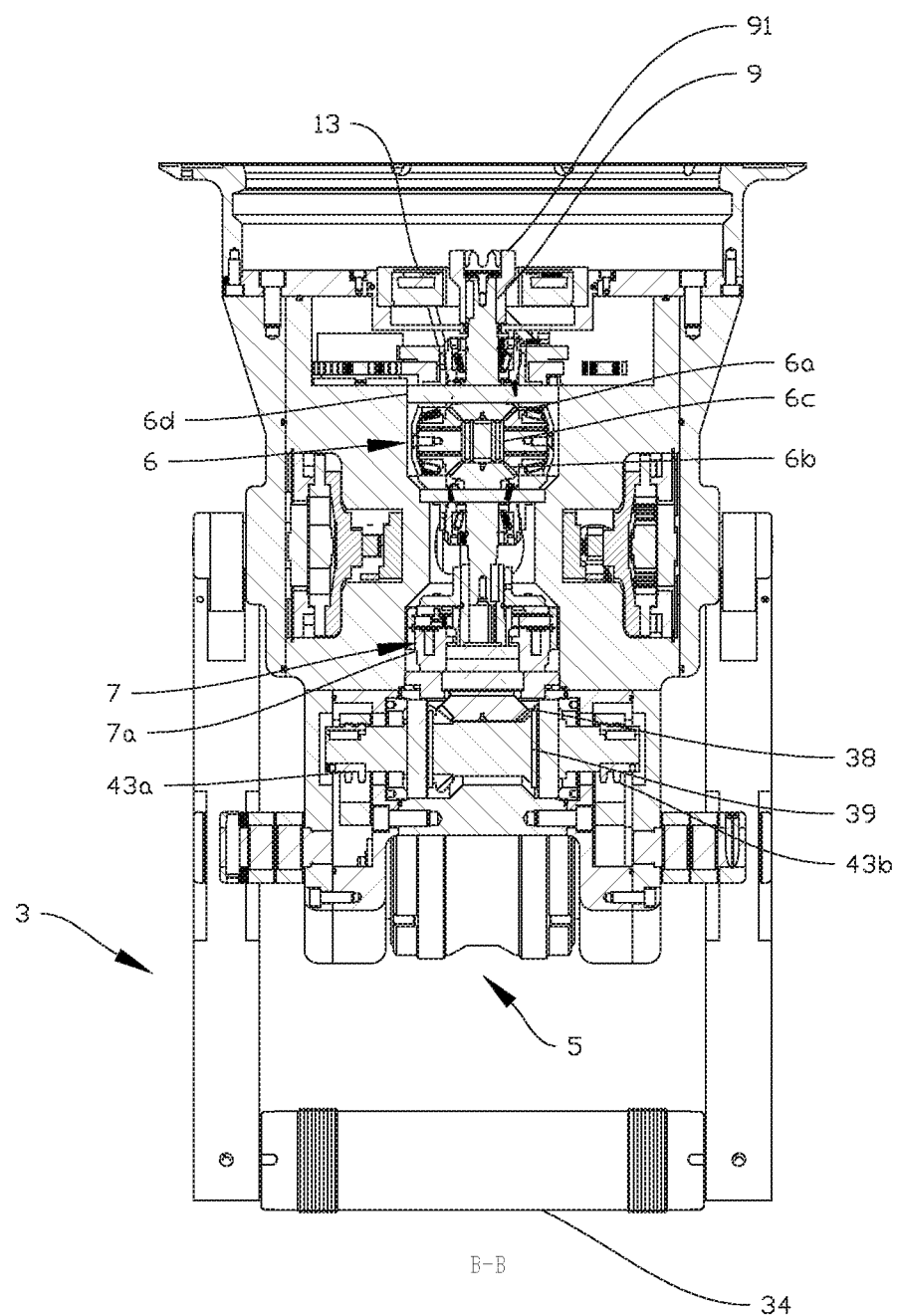
FIG. 5 shows, in a cross-sectional view, the gripper as seen through the line B-B from FIG. 2.
Figure 6:
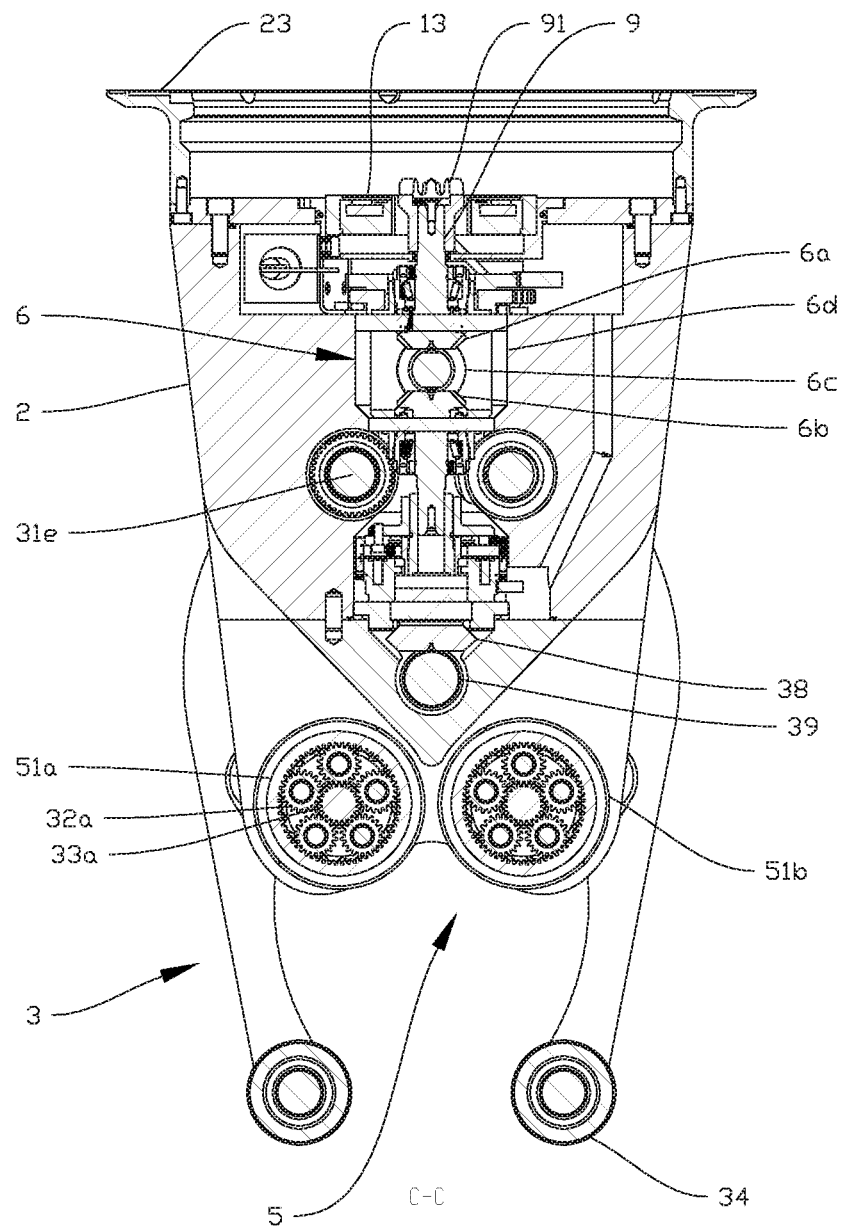
FIG. 6 shows, in a cross-sectional view, the gripper as seen through the line C-C from FIG. 3.
Figure 7:
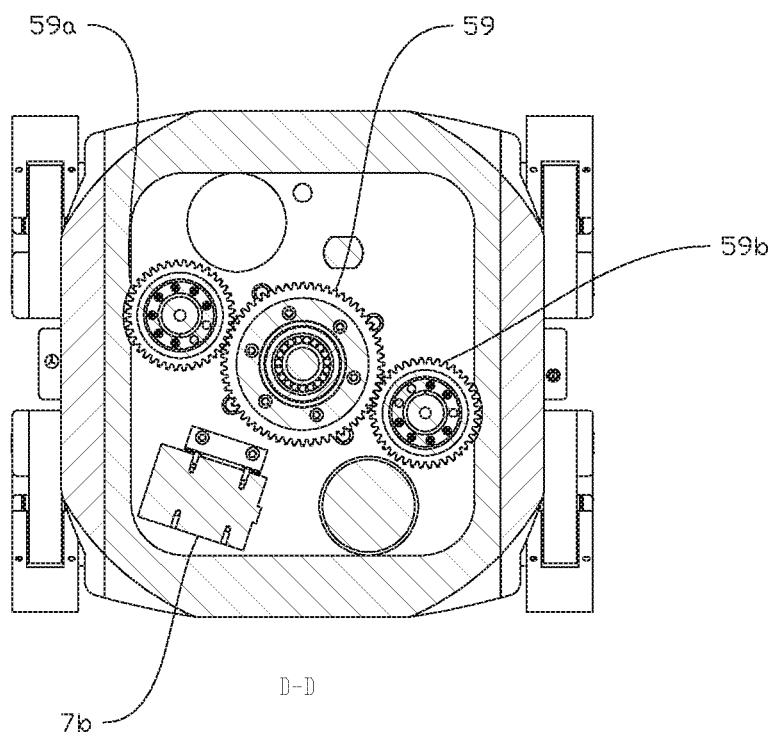
FIG. 7 shows, in a cross-sectional view, the gripper as seen through the line D-D from FIG. 3.
Figure 8:
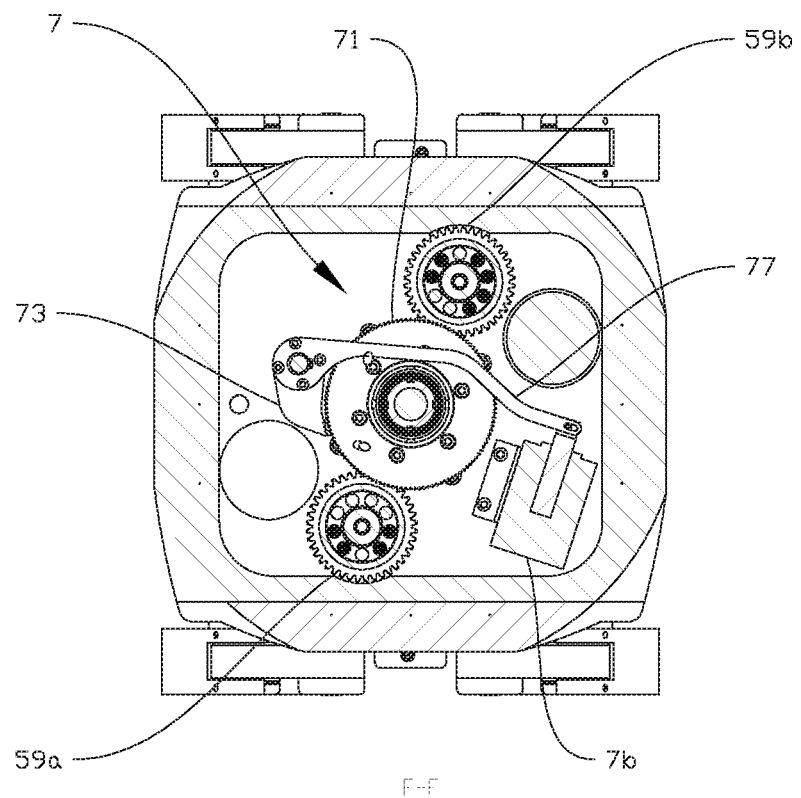
FIG. 8 shows, in a cross-sectional view, the gripper as seen through the line F-F from FIG. 2.

Reference is now made to FIGS. 4-9, which are various cross-sections taken from FIGS. 2 and 3. An input shaft 9, with shaft connection 91, is connected to a differential coupling means 6, which will be described in the following. The input shaft 9 is connected to a first differential gear 6a further connected to a differential spider gear 6c which in turn is connected to a differential housing 6d and to second differential gear 6d, as can be best seen in FIGS. 5 and 6. The differential coupling means 6 divides input power from the rotatable input shaft 9 into what may be described as two branches, wherein one branch provides the gripping function while the other branch provides the spinning function. In the shown embodiment, the gripping function is activated upon rotation of the differential housing 6, while the spinning function is activated by rotation of the second differential gear 6d. For transferring the power as effectively as possible, the gripper 1 is provided with breaking means 7 selectively disabling one of the two branches so that the input power may be supplied to either the gripping means 3 or to the spinning means 5. In the shown embodiment the breaking means 7 comprises a first break 7a in the form of an electromechanical holding brake and a second brake 7b in the form of a solenoid actuator, see FIG. 8, both energizable and controllable via inductive coupling means 13 as will be described more in detail below. For activating the gripping means 3, the inductive coupling means 13 will energize the holding brake 7a to prevent the second differential gear 6b from rotating thereby disabling the spinning function. As the second differential gear 6b is blocked, the first differential gear 6a and the spider gear 6c will set the differential housing 6d in rotation, if possible. The solenoid actuator 7b, which is best seen in FIG. 8, pulls a lever arm 77 connected to a ratchet mechanism 73. The ratchet mechanism 73, when energized by the solenoid actuator 7b, is freed from its engagement with a ratchet wheel 71, thus allowing the ratchet wheel 71 to be rotated. In its idle state, the ratchet 73 mechanism is biased by means of a not shown spring so as to prevent the ratchet wheel 71 from rotating, thereby disabling the gripping function as will be explained in the following. The inductive coupling means 13 activates the solenoid actuator 7b, thus allowing the ratchet wheel 71 to rotate. The ratchet wheel 71 is connected to a first spur gear 59, the first spur gear further being connected to a second spur gear 59a and third spur gear 59b, as best seen in FIGS. 7 and 8. The second spur gear 59a is connected to a hypoid gear pinion 47a, the hypoid gear pinion 47a further being connected to a hypoid gear 48a, as can be best seen in FIG. 4. The hypoid gear 48a is further connected to a sun gear 49a engaged with a planet gear stage 53a including a stationary ring gear. Finally the planet gear stage 53a is driving a first drive shaft 55a, the drive shaft 55a having an axis of rotation coinciding with the rotation axis 31e and the drive shaft being connected to and being able to drive the drive arms 31b for moving the gripper arms 31a. The third spur gear 59b has similar connections, i.e. driving a hypoid gear pinion 47b, in turn driving a second drive shaft 55b. The above description describes one embodiment of the mechanisms involved for activating the gripping means 3. The gripping force may be controllable by measuring torque on a motor driving the input shaft 9. The motor may be provided in the gripper conveying means 14 as will be discussed below.

Figure 9:
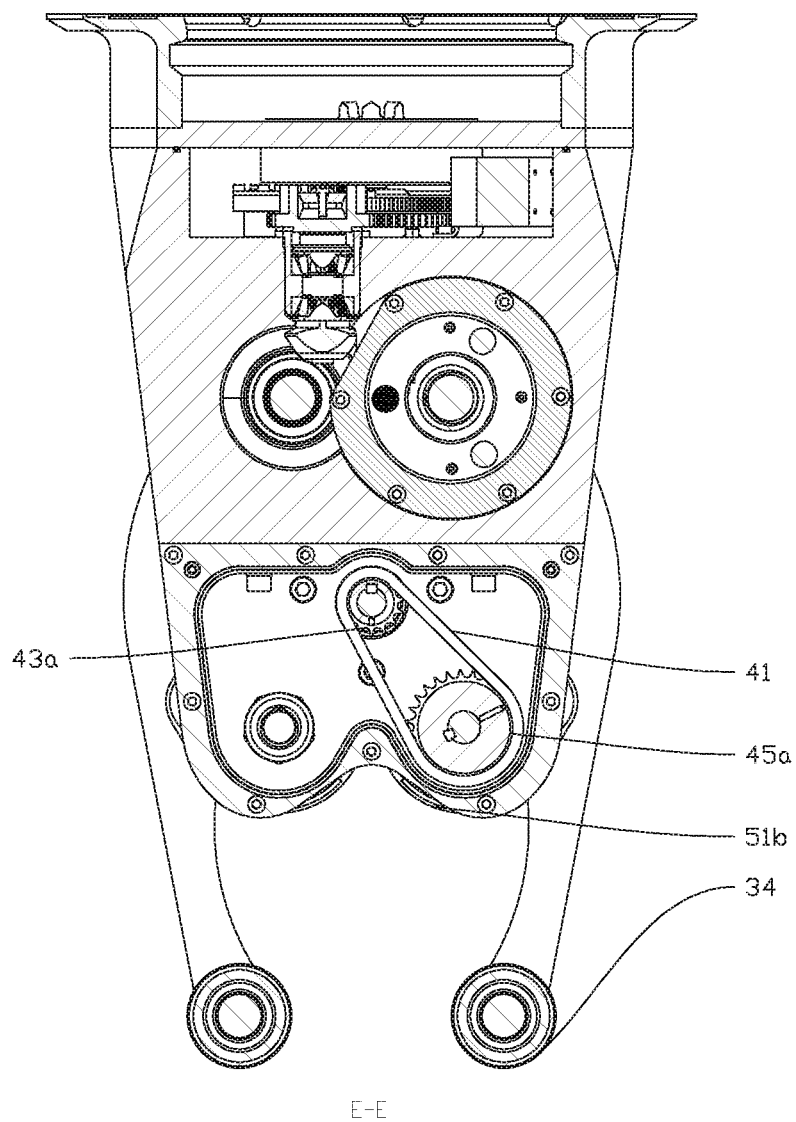
FIG. 9 shows, in a cross-sectional view, the gripper as seen through the line E-E from FIG. 3.

In a second position of use, typically when a pipe body 11 has already been gripped by the gripper 1, the spinning means 5 may be activated. The gripping function is then disabled by deactivating the solenoid actuator 7b. The biasing spring will then force the ratchet mechanism 73 into engagement with the ratchet wheel 71, thus locking the differential housing 6d and thereby disabling movement of the gripping arms 31a. At the same time, the holding brake 7a is deactivated so that the second differential gear 6b becomes free to rotate. The input shaft 9 is connected to the second differential gear 6b via the first differential gear 6a and the differential spider gear 6c. The second differential gear 6b is connected to a bevel gear pinion 38, the bevel gear pinion driving a bevel gear shaft 39, as best seen in FIGS. 5 and 6. The bevel gear shaft 39 is connected with a first chain wheel 43a and a second chain wheel 43b. The first chain 43a wheel is further connected to a third chain wheel 45a via a chain 41, as best seen in FIG. 9. The third chain wheel 45a is connected to a roller sun gear 33a further connected to a plurality of roller planet gears 32a, as can be best seen in FIG. 6. The roller planet gears 32a engage with the active roller 51b. The second chain wheel 43b is similarly connected to a fourth chain wheel 45b similarly driving the first active roller 51a, the first and second active rollers 51a, 51b constituting the spinning means 5. Each active roller 51a, 51b is provided with two track rings 51c held in place by locking nuts 51d, the track rings 51c providing the necessary friction for a pipe body 11 held in the gripping arms 31a to be rotated.

Figure 10:
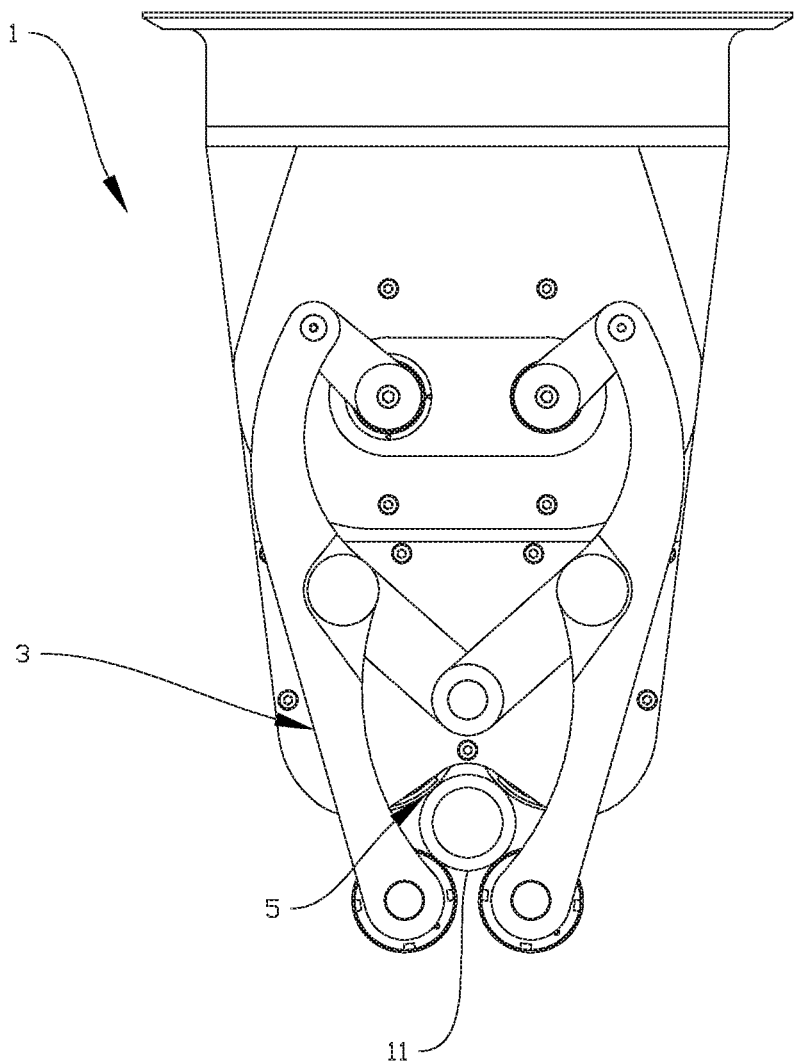
FIG. 10 shows, in a top view, the gripper from FIG. 1 holding a small diameter pipe.
Figure 11:
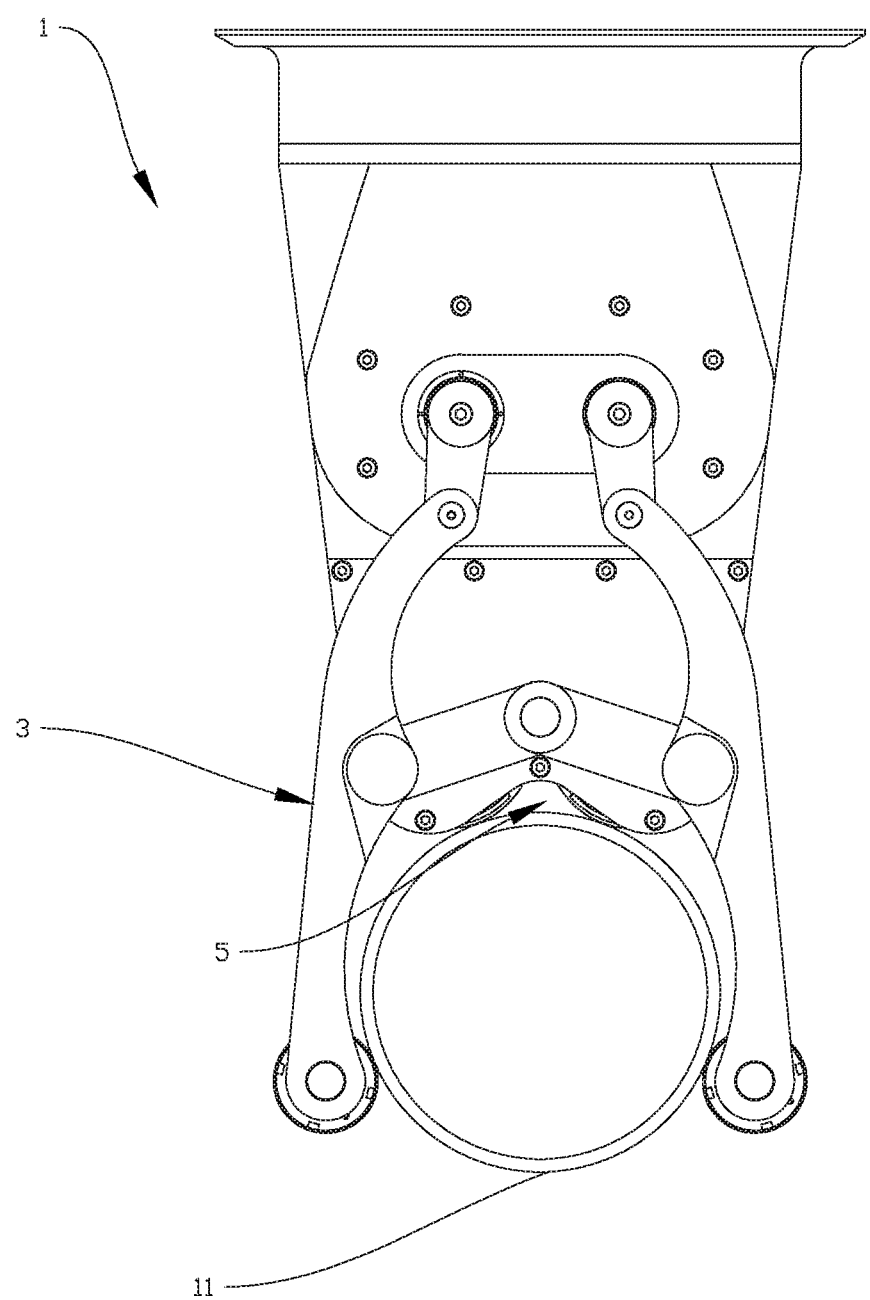
FIG. 11 shows, in a top view, the gripper from FIG. 1 holding a large diameter pipe.

FIGS. 10 and 11 show the gripper 1 holding a small diameter pipe 11 and a large diameter pipe 11, respectively. Once again reference is made to U.S. Pat. No. 8,419,097 for an in-depth description of the functionality of the gripping means 3.

Figure 12:
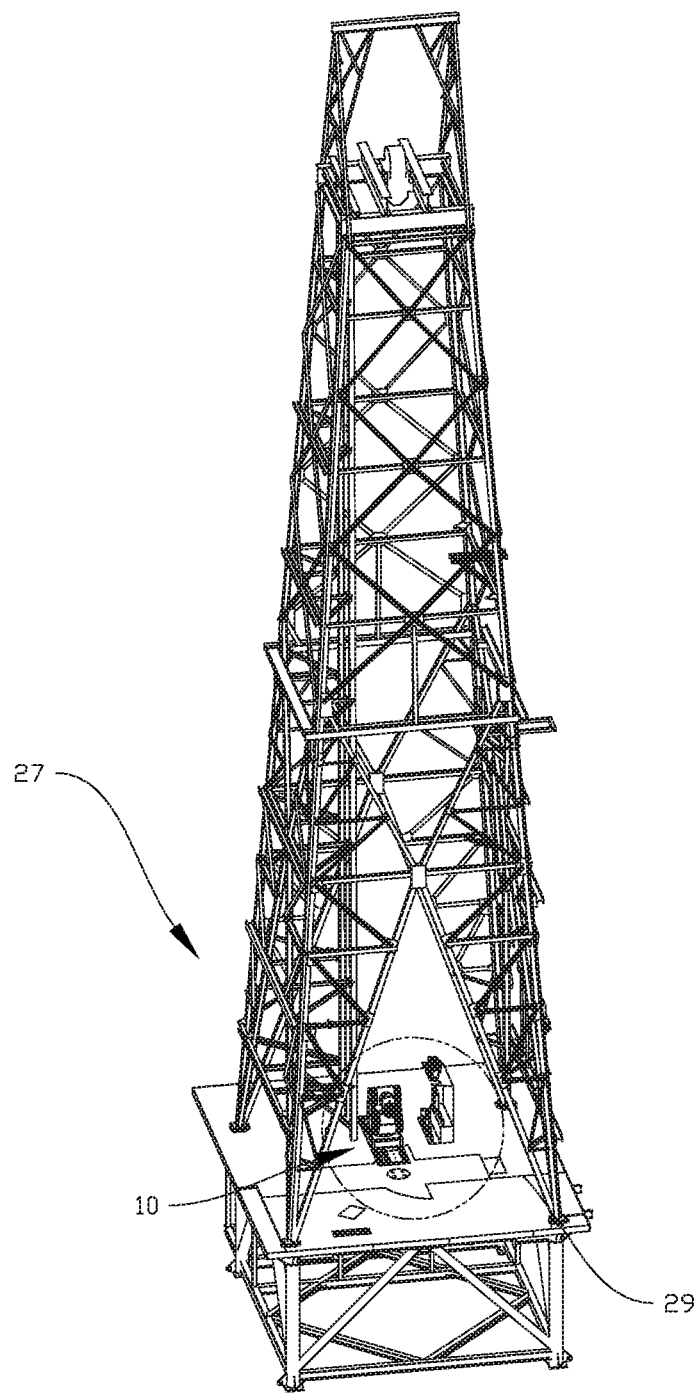
FIG. 12 shows, in a perspective view, a drilling rig comprising a system according to the present disclosure.
Figure 13:
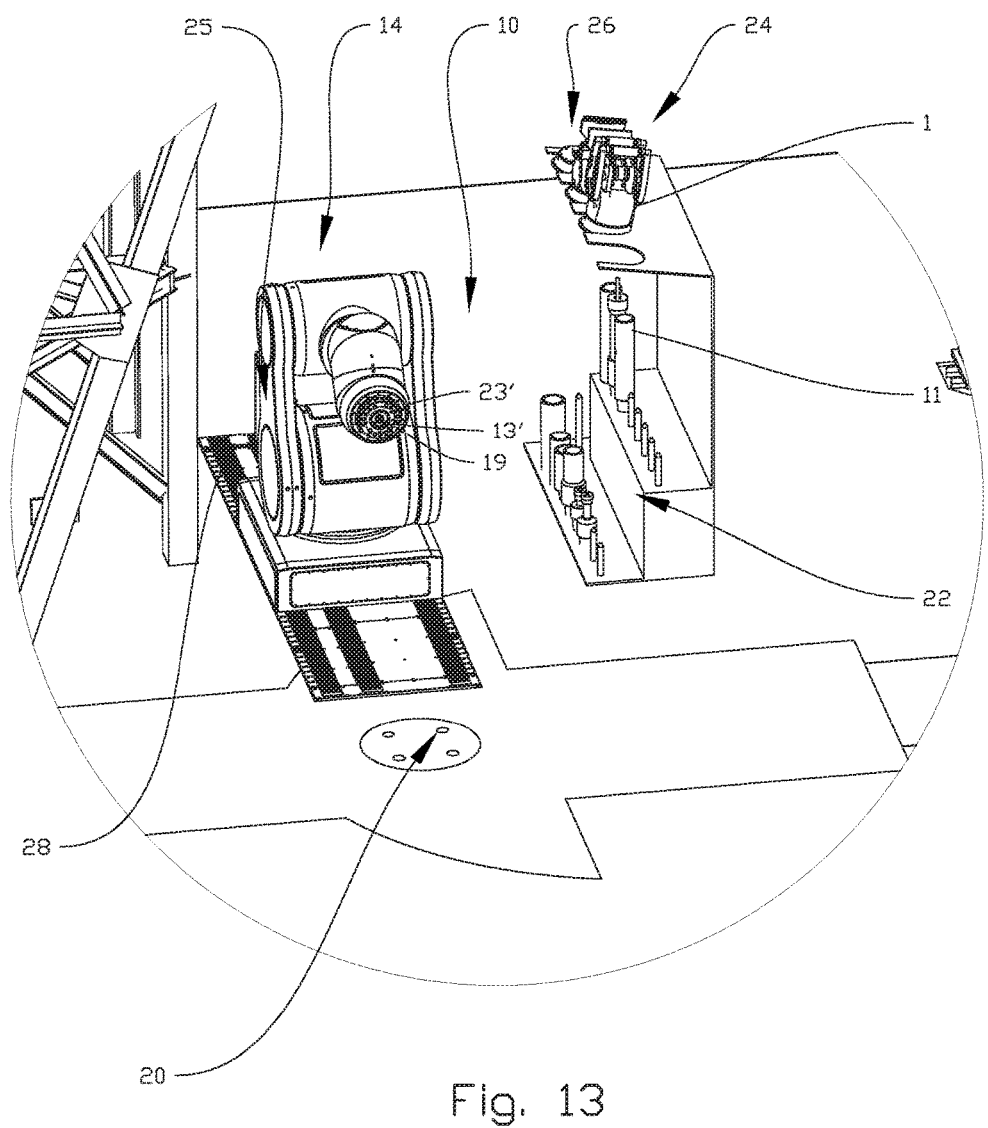
FIG. 13 shows, in a large scale, the system from FIG. 12.

FIGS. 12 and 13 show a drilling rig 27 where a system 10 as described above is provided on the rig floor 29. The system 10 comprises a conveying means 14 in the form of a robot, which is best seen in the enlarged view in FIG. 13. The robot 14, which will not be discussed in detail herein, has six rotational axes and is also adapted to be translated along a track 28 as indicated in the figures. The drilling rig 27 is further provided with a tool magazine 24 provided with a plurality of tools 26, including one or more grippers 1 as described above. The robot 14 approaches the tool magazine 24 and connects to the gripper 1. A tool interface 23' on the robot 14 fits complimentary to the flanged tool interface 23 on the gripper 1. A rotatable output shaft 19 on the robot connects to the shaft connection 91 on the rotatable input shaft 9 on the gripper 1. Upon connecting the gripper 1 to the robot 14, inductive coupling means 13' on the robot is brought into proximity with the inductive coupling means 13 on the gripper, thereby enabling wireless transfer of power and communication to the gripper, and also feedback communication from the gripper 1 to the robot 14. The tool interfaces 23, 23' and the rotatable input and output shafts 9, 19 constitute the connecting means of the gripper 1 and the robot 14. The connecting means is provided as a standardized tool interface allowing the robot 14 to connect and disconnect to and from each of the tools 26 in the tool magazine 24. The rig floor is also provided with a storage area 22 for pipe bodies 11. The robot 14, connected to the gripper 1, is translated along the track 28 to approach the storage area 22 to grip a pipe body 11. The robot 14 may further move the pipe body 11 on the rig floor 29, such as to a well centre 20 in order to spin the pipe body 11 into a not shown pipe string. It should also be noted that the system 10 in the shown embodiment is controllable by means of a control unit 25 provided in the robot. The control unit 25 may receive instructions from an operator to have the system perform a certain task, whereby the control unit 25 activates the robot to pick up a preferred tool, which according to this embodiment is a gripper 1. The control unit also activates or deactivates the power supply via the inductive coupling means 13, 13' and the control unit 25 starts and stops a not shown motor provided in the robot 14 to operate the gripper 1 by rotating the rotatable input shaft 9 as described above.

The above-mentioned embodiments illustrate rather than limit the present disclosure, and that those skilled in the art will be able to design many alternative embodiments without departing from the scope of the appended claims. In particular, a person skilled in the art would be able to construct the gearing from the differential coupling means to the gripping means and to the spinning means in a variety of different ways without departing from the scope of the disclosure. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The invention claimed is:

1. Gripper for gripping and spinning a pipe body, the gripper comprising:
   gripping means for gripping said pipe body;
   spinning means for spinning said pipe body while said pipe body is being gripped by said gripping means;
   a rotatable input shaft; and
   a coupling means for connecting said rotatable input shaft to said gripping means and to said spinning means and for selectively engaging either one of said gripping means and said spinning means while disengaging the other one of said gripping means and said spinning means;
   wherein, the coupling means comprises a differential coupling means; and
   wherein said gripper further comprises braking means configured to engage said differential coupling means so as to selectively prevent at least one of said gripping means and said spinning means from being operated upon rotating said rotatable input shaft.

2. Gripper according to claim 1, wherein said gripper further comprises inductive coupling means for receiving wireless power and/or communication from an external source.

3. Gripper according to claim 2, wherein said inductive coupling means is connected to said coupling means for selectively engaging said gripping means and said spinning means.

4. Gripper according to claim 1, wherein said spinning means includes one or more active rollers.

5. Gripper according to claim 4, wherein the one or more active rollers comprise internal gearing means, connecting said one or more active rollers to said coupling means.

6. Gripper according to claim 4, wherein said gripping means is provided with one or more passive rollers.

7. Gripper according to claim 1, wherein said gripping means is adapted to securely hold pipes of different diameters.

8. Gripper according to claim 1, wherein the gripper further comprises connecting means for selectively connecting said gripper to a gripper conveying means.

9. Gripper according to claim 1, further comprising biasing means for biasing said gripping means relative to a pipe body.

10. Gripper according to claim 9, wherein said biasing means is a torsion spring.

11. System for gripping, moving and spinning a pipe body, the system comprising:
a gripper according to claim 1; and
a gripper conveying means provided with a rotatable output shaft connectable to said rotatable input shaft of the gripper.

12. System according to claim 11, wherein the system further comprises a control unit for operating said gripper and said gripper conveying means.

13. System according to claim 11, wherein said conveying means is a robot.

14. System according to claim 11, wherein said gripper conveying means further comprises an inductive coupling means for transferring power and/or communication to said gripper.

15. A drilling rig comprising a system according to claim 11.

16. Method for gripping, moving and spinning a pipe body using a gripper, the gripper comprising: a gripping means for gripping said pipe body; a spinning means for spinning said pipe body while said pipe body is being gripped by said gripping means; a rotatable input shaft; and a coupling means for connecting said rotatable input shaft to said gripping means and to said spinning means and for selectively engaging either one of said gripping means and said spinning means while disengaging the other one of said gripping means and said spinning means; wherein, the coupling means comprises a differential coupling means, and wherein said gripper further comprises braking means configured to engage said differential coupling means so as to selectively prevent at least one of said gripping means and said spinning means from being operated upon rotating said rotatable input shaft and a gripper conveying means having a rotatable output shaft connectable to said rotatable input shaft of the gripper the method comprising the steps of:
connecting said rotatable output shaft of the gripper conveying means to said rotatable input shaft on said gripper;
selectively engaging said gripping means so as to grip a pipe body; and
selectively engaging said spinning means so as to spin said pipe body.

17. Method according to claim 16, wherein the method further comprises the step of:
moving said pipe body from a storage location to an operation location by means of said gripper conveying means.

18. Method according to claim 16, wherein the method further comprises the step of:
spinning the pipe body so as to connect or disconnect said pipe body to or from a pipe string.

19. Method according to claim 16, wherein the method further comprises the steps of:
selectively engaging said gripping means so as to release said pipe body from the gripper; and
disconnecting said rotatable output shaft of the gripper conveying means from said rotatable input shaft of the gripper.

* * * * *

UNITED STATES PATENT AND TRADEMARK OFFICE
CERTIFICATE OF CORRECTION

| | |
|---|---|
| PATENT NO. | : 10,370,913 B2 |
| APPLICATION NO. | : 15/531644 |
| DATED | : August 6, 2019 |
| INVENTOR(S) | : Svein Søyland et al. |

It is certified that error appears in the above-identified patent and that said Letters Patent is hereby corrected as shown below:

On the Title Page

Item [72], delete "Kjetil Næsgaar" and insert --Kjetil Næsgaard--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*